(No Model.)
C. I. KING.
LATHE TURRET.
No. 401,564. Patented Apr. 16, 1889.
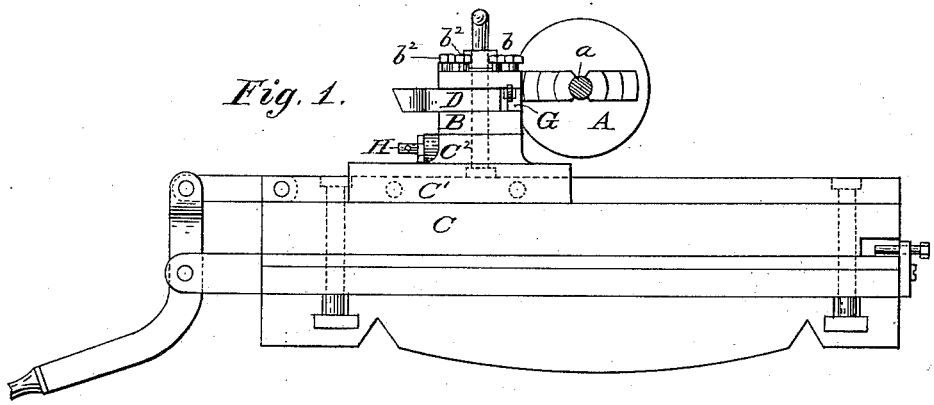
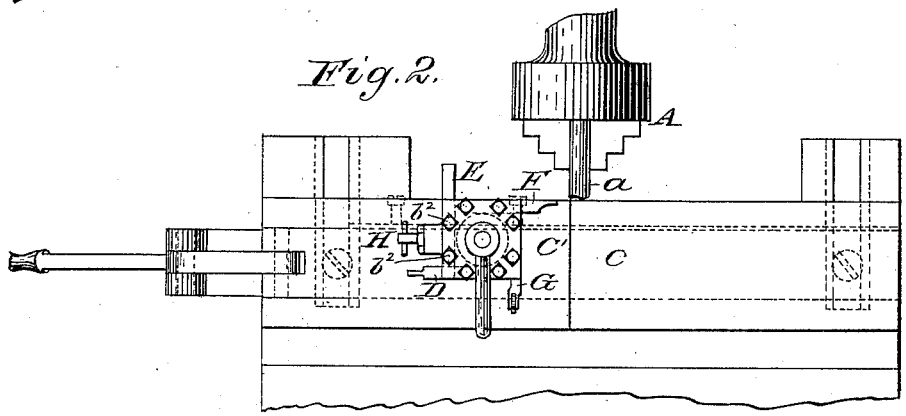
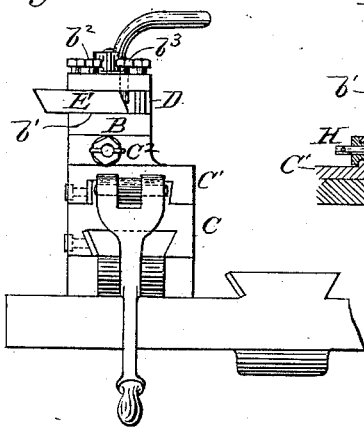
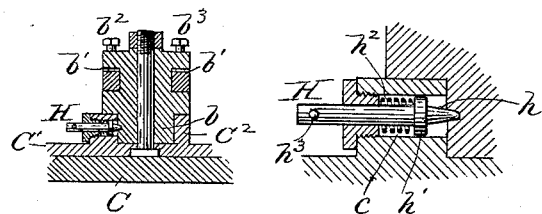
WITNESSES:
INVENTOR
Charles I. King.
BY
Dayton, Poole & Brown
ATTORNEYS

UNITED STATES PATENT OFFICE.

CHARLES I. KING, OF MADISON, WISCONSIN.

LATHE-TURRET.

SPECIFICATION forming part of Letters Patent No. 401,564, dated April 16, 1889.

Application filed August 20, 1888. Serial No. 283,170. (No model.)

*To all whom it may concern:*

Be it known that I, CHARLES I. KING, of Madison, in the county of Dane and State of Wisconsin, have invented certain new and useful Improvements in Lathe-Turrets; and I do hereby declare that the following is a full, clear, and exact description thereof, reference being had to the accompanying drawings, and to the letters of reference marked thereon, which form a part of this specification.

This invention relates to improvements in the arrangement of the tools or of the tool-holding devices of lathe-turrets, and to other features of construction in such turrets.

The object of the invention is to better adapt the turret for side work, and particularly in chuck-lathes when the work is desirably done close to the chuck—as, for example, in forming and finishing milled nuts and similar articles from continuous rods.

The principal feature of the invention consists in the arrangement of the tools of the turret tangentially to a circle or circles having the axis of the turret for its or their center, or, in other words, in lines parallel to the radii of the turret.

Other features of the invention will hereinafter appear.

In the accompanying drawings the invention is illustrated in connection with a chuck-lathe, of which, however, only those parts adjacent to or more directly concerned with the turret are shown.

Figure 1 is an elevation, as seen from the foot of the lathe, of the chuck and tool slide having the improved turret mounted thereon, together with the devices for sliding the turret transversely to the lathe-axis upon the tool-slide. Fig. 2 is a top or plan view of the same matters that are shown in elevation in Fig. 1. Fig. 3 is an elevation of the same matters viewed from the front of the lathe. Fig. 4 is a vertical section of the turret and adjacent parts of its base and supporting-slide, showing the axial stud and the stop-pin in full view. Fig. 5 is a larger sectional detail of the spring-stop device shown in Fig. 4.

A represents the lathe-chuck, B the turret, and C the crop-slide, upon which the base C' of the turret is adjustably secured. The turret, while it may be of other forms than shown, is illustrated as being square in plan view, and adapted to carry four serial tools or cutters, D, E, F, and G, suitable for slide-work upon a rod, $a$, held in the chuck A. At its lower end the turret B is shown provided with a cylindric prolongation, $b$, which rests and rotates in a correspondingly-shaped socket in the top of the base C'. In each of the plane sides of the turret, as here illustrated, is cut a groove, $b'$, to serve as a tool-seat, and through the superjacent ledge of the turret is threaded one or more set-screws, $b^2$, by which the tool is firmly clamped against the lower wall of the groove. In this form of the tool-seats each tool extends at its rear or inner end less than the full length of the groove, and each tool projects at its front or working end past the heel of its neighbor, giving a tangential arrangement of the tools with respect to a circle having the axis of the turret for its center. The tools projecting thus in lines parallel with instead of in the radii of the turret are capable of being brought closer to the chuck at their working ends, and the rod being cut is better supported by the chuck at the point when it receives the pressure of the tool.

Another feature of the invention relates to the longitudinal adjustment of the several tools in their seats, or to the provision of an adjustable rear stop for each of said tools. Each tool, as stated, terminates at its rear end within its seat. This rear end of the tool is beveled downwardly and backwardly from top to bottom, and through the overhanging ledge of turret is threaded a screw, $b^3$, the lower end of which projects into the tool-groove and bears against the rear inclined end of the tool. Obviously the farther the screw projects into the groove the farther forward will the tool be thrust or held, and vice versa.

In the tangential arrangement of the tools set forth the thrust upon them when at work will manifestly tend to rotate the turret. The lock or stop by which the turret will be held from such rotation must be certain in its action both to give and retain the true position of the turret for each of the tools. The construction shown for this purpose consists of a radial sliding pin, H, mounted to move lengthwise in a recess, $c$, in the flange or boss $C^2$ on the base C', and projecting at its inner end into a properly-situated circular hole in the cylindric part $b$ of the turret. The inner end of the pin is tapered slightly, so as not to be forced back by the tangential pressure applied to the turret when at work, and so, also, as to more certainly bring the turret to exact position in entering the hole. Being tapered, the pin will advance into the hole till it fills the lathe, and will thus insure accuracy of position on the part of the turret. Back of the taper the pin is provided with a collar or enlargement, $h'$, which closely fills the recess $c$, in which it moves, and between the collar and a shoulder in the outer part of the recess is interposed an expanding coiled spring, $h^2$, which operates to throw the pin inward. Externally to the flange $C^2$ the pin H is provided with a crop-bar, $h^3$, or its equivalent, by which it may be conveniently pulled outward by hand to disengage its inner end from the turret.

The tools may manifestly be otherwise secured in their tangential relations, and may, if necessary, be given other forms for this purpose, and I therefore do not wish to be restricted to the precise construction shown.

By arranging suitable tools for end or face work in reversed positions (as to their projecting ends) from those shown, the same thrust may be employed for both end work and side work, with the advantage of requiring but short movement of the crop-slide on its guide to bring the turret into and out of its position for such end work.

I claim as my invention—

1. The combination, with a lathe-turret, of a tool having its working-point in a line parallel with and out of the radius of the turret.

2. A lathe-turret provided with tangentially-arranged tool-seats.

3. A lathe-turret provided with lateral grooves for tool-seats, and set-screws threaded through the top ledges of the grooves.

4. The combination, with a lathe-turret provided with a tool-seat, of a tool having its rear end inclined, and an adjusting-screw having its end projected into bearing upon the inclined end of the tool and movable in a direction transverse to the length of the tool.

5. The combination, with a rotatable lathe-turret, its stationary support, and tools so arranged in the turret as to impose tangential pressure upon the turret, of a spring-actuated pin radially mounted in the stationary support of the turret, and having its inner end tapered to enter and fill a suitable hole provided in the turret.

In testimony that I claim the foregoing as my invention I affix my signature in presence of two witnesses.

CHARLES I. KING.

Witnesses:
J. D. PURCELL,
J. E. CONOHAN.